US008573530B2

(12) United States Patent
Cazals et al.

(10) Patent No.: US 8,573,530 B2
(45) Date of Patent: Nov. 5, 2013

(54) AIRCRAFT WITH REAR ANNULAR TAIL

(75) Inventors: Olivier Cazals, Daux (FR); Thierry Druot, Saint Jean (FR)

(73) Assignee: Airbus Operations SAS, Toulouse (FR)

( * ) Notice: Subject to any disclaimer, the term of this patent is extended or adjusted under 35 U.S.C. 154(b) by 895 days.

(21) Appl. No.: 12/516,594

(22) PCT Filed: Nov. 29, 2007

(86) PCT No.: PCT/FR2007/001959
§ 371 (c)(1),
(2), (4) Date: Mar. 25, 2010

(87) PCT Pub. No.: WO2008/081098
PCT Pub. Date: Jul. 10, 2008

(65) Prior Publication Data
US 2012/0325958 A1 Dec. 27, 2012

(30) Foreign Application Priority Data
Nov. 30, 2006 (FR) ..................................... 06 55199

(51) Int. Cl.
*B64C 39/06* (2006.01)
(52) U.S. Cl.
USPC .............................. 244/34 A; 244/54; 244/87
(58) Field of Classification Search
USPC .................... 244/12.6, 34 A, 45 R, 54, 55, 87
See application file for complete search history.

(56) References Cited

U.S. PATENT DOCUMENTS

| 2,194,596 | A | * | 3/1940 | Henter ............................ 244/13 |
| 3,301,509 | A | | 1/1967 | Sendish |
| 6,102,332 | A | | 8/2000 | Haxton et al. |
| 6,592,073 | B1 | | 7/2003 | Meekins |
| 2009/0065632 | A1 | * | 3/2009 | Cazals ............................ 244/15 |

FOREIGN PATENT DOCUMENTS

| DE | 199 19 626 A1 | 11/2000 |
| DE | 201 11 224 U1 | 1/2002 |
| EP | 1 616 786 A1 | 1/2006 |
| FR | 1 177 330 A | 4/1959 |
| FR | 2 411 128 A | 7/1979 |
| FR | 2 759 971 A | 8/1998 |
| WO | 2004/074093 A | 9/2004 |

* cited by examiner

*Primary Examiner* — Timothy D Collins
*Assistant Examiner* — Nicholas McFall
(74) *Attorney, Agent, or Firm* — Ingrassia Fisher & Lorenz P.C.

(57) ABSTRACT

A rear tail assembly for an aircraft, including a fuselage, a wing and at least one propulsion engine attached in the rear portion of the fuselage located behind the wing along the X longitudinal axis of the aircraft, wherein the aforementioned assembly includes aerodynamic surfaces connected in the rear portion of the fuselage. The tail assembly essentially includes horizontal aerodynamic surfaces and essentially vertical aerodynamic surface arranged so as to form an annular structure including at least one ring attached to the fuselage. At least one engine is held in the ring formed by the tail assembly. In one embodiment, a central fin is used for defining two rings in the annular structure. In particular embodiments of an aircraft including such a tail assembly, one or two engines can be fitted in the ring area.

9 Claims, 3 Drawing Sheets

AIRCRAFT WITH REAR ANNULAR TAIL

This application is the National Stage of International Application No. PCT/FR2007/001959 International Filing Date, 29 Nov. 2007, which designated the United States of America, and which International Application was published under PCT Article 21 (s) as WO Publication 2008/081098 A1 and which claims priority from, and the benefit of, French Application 200655199 filed on 30 Nov. 2006, the disclosures of which are incorporated herein by reference in their entireties.

BACKGROUND

The aspects of the disclosed embodiments are in the field of aircraft with aft propulsion and aft tail sections.

More specifically, the disclosed embodiments propose an architecture having a set of aft aircraft tail sections forming an annular self-enclosed structure, combined with one or more propulsion engines, also located in the aft part of the plane.

On transport planes propelled by jet engines or turboshaft engines, such as unducted fans or UDF, as they are called in English, the aft tail sections most often have, in the so-called basic form of the approximately vertical aerodynamic surfaces, the vertical tail section, and others approximately horizontal, the horizontal tail section, attached to the aft part of the fuselage, aerodynamic surfaces that ensure the stability of the aircraft in flight and make it possible to control it by means of rudders and elevators attached to said aerodynamic surfaces.

This form of basic conventional tail section is widely used on many civilian transport planes, like the Airbus A320, for example.

In less frequently used forms, particularly on civilian transport planes, the horizontal tail section is attached to the vertical tail section either on top of the latter, the so-called T-shaped tail section, for example on the Bael 46 plane, or at mid-height position, the so-called cruciform tail section, on the Aerospatiale SE210 Caravelle.

In other forms also known, the vertical tail section has two vertical aerodynamic surfaces attached to the end of the horizontal tail section, the so-called H-shaped tail section, as on the Nord2500 Noratlas.

Another known shape of the aft tail section consists of two surfaces inclined between the vertical and the horizontal to form a V whose combination performs the functions of both vertical and horizontal aerodynamic surfaces. This type of so-called butterfly tail section is used mainly on the CM170 Fouga Magister.

The choice of the shape of tail section for an aircraft generally depends on aerodynamic and structural considerations, and is influenced by the position and type of propulsion engines that generate both aerodynamic and structural stresses, but also on operational safety since engine failures, such as a turbine explosion, should not have such an impact on the tail sections that the aircraft can no longer be controlled.

On current aircraft, the different basic tail section shapes, where the aerodynamic surfaces of the tail section are not individually attached to the fuselage, have aircraft architectures with aft tail sections, but the known shapes—T, cruciform, H and V—are very close in the design of their basic shape with no overall aerodynamic and structural optimization of the tail section units with propulsion engines.

SUMMARY

The disclosed embodiments propose an aft tail section architecture for an aircraft that is compatible with the installation of turbojets, particularly the modern generation of turbojets with high bypass ratios, or unducted fan propulsion units in the aft part of the plane, which optimize the tail sections through a combination of so-called aerodynamic tail-section surfaces forming a single or double, so-called annular, closed surface.

The aft tail section unit in the disclosed embodiments is suitable for an aircraft with a fuselage, a wing and at least one propulsion engine attached to the aft part of the fuselage, i.e., part of the fuselage located in back of the wing along one longitudinal axis X of the aircraft.

The tail section unit has aerodynamic surfaces attached to the aft part of the fuselage and is basically comprised of approximately horizontal aerodynamic surfaces and approximately vertical aerodynamic surfaces designed to form an annular structure with at least one ring attached to the fuselage, in which ring there is at least one aft engine.

In one preferred embodiment, the structure of the aft tail section unit has:
- two approximately horizontal lower aerodynamic surfaces attached to the fuselage, near a wing root section of each of the so-called lower aerodynamic surfaces approximately symmetrical in relation to a vertical plane of symmetry XZ of the aircraft;
- two approximately vertical aerodynamic surfaces, with each of said two vertical aerodynamic surfaces attached by the lower end to one end of a lower aerodynamic surface opposite the wing root section of the lower aerodynamic surface in question;
- an approximately horizontal upper aerodynamic surface attached by the wingspan ends to the upper ends of the vertical aerodynamic surfaces.

By their design, the lower, vertical and upper aerodynamic surfaces attached to the fuselage by the aerodynamic surfaces form a ring.

Advantageously, the lower, upper and vertical aerodynamic surfaces, at least some of them, are provided with mobile elements forming aerodynamic rudders that make it possible to control the aircraft.

To control aerodynamic leaks in the tail section area, the aerodynamic surfaces of the tail section unit are attached to one another by curved connecting and assembly elements.

In one embodiment, a central stabilizer is attached to the fuselage on its bottom and attached to the upper aerodynamic surface on the top of said central stabilizer, so the tail section unit forms a two-ring structure with enhanced resistance and rigidity.

To respond to engine maintenance concerns, each annular structure advantageously includes:
- an opening area on the lower aerodynamic surface located at or near the fuselage, with said opening area having means of locking and unlocking parts of said lower aerodynamic surface located on either side of said opening area;
- an articulated area near part of the upper aerodynamic surface forming part of the ring in question, with said articulated area permitting upward movement by rotation of an axis approximately parallel to a longitudinal axis X of the aircraft when the locking/unlocking means are in the unlocked position.

The disclosed embodiments also concern an aircraft having such an aft tail section unit without a central stabilizer and a propulsion engine attached to the upper aerodynamic surface and under said upper aerodynamic surface by a support strut.

In this case, an approximately vertical maintenance well goes through the fuselage with dimensions and location such that the engine can be raised and lowered approximately vertically through the well away from or toward its position attached to the upper aerodynamic surface.

Hatches are used to close the lower and upper openings of the well, during normal aircraft operation, to maintain the continuity of the aerodynamic forms of the fuselage.

The disclosed embodiments also concern an aircraft having such an aft tail section unit and propulsion engines fit approximately into the ring or rings formed by the tail sections, with each engine attached to the fuselage by a support strut.

The disclosed embodiments also concern an aircraft having such an aft tail section unit with a central stabilizer and propulsion engines that fit approximately into the rings formed by the aft tail unit, with each engine attached to the central stabilizer by a support strut.

The description of different embodiments of the disclosed embodiments is given with reference to the figures, which show schematic views of different designs of annular tail sections for the aircraft in the disclosed embodiments:

DETAILED DESCRIPTION

Figure 1:
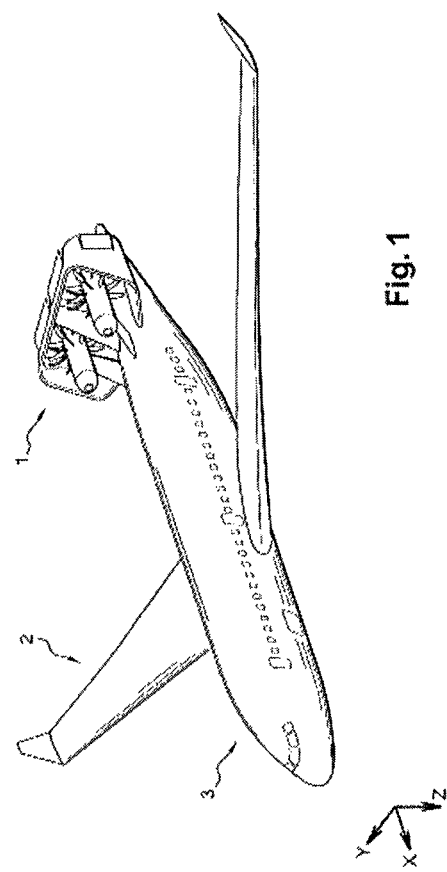
FIG. 1 shows a rear-mounted twin-engine aircraft with the tail section in one embodiment.

FIG. 1 shows an aircraft with an example of the architecture for a unit of aft tail sections 1 in the disclosed embodiments.

A unit of aft tail sections 1 is understood as a unit of aerodynamic surfaces forming the tail sections and located in back of a wing 2 in relation to the longitudinal axis X of the aircraft and oriented positively toward the front, which corresponds approximately to the direction of movement of the aircraft in flight.

The expression "aerodynamic surface" here is taken to mean a structure whose conformation is appropriate for the creation of aerodynamic lift forces like, for example, the wing of an airplane, a horizontal tail section or an aircraft stabilizer.

The wing 2 and the tail section unit 1 are attached to the aircraft fuselage 3 in the conventional wing aspect ratio.

In the conventional way, the aircraft has a standard body axis system defined by the longitudinal axis X, for a vertical axis Z oriented positively toward the bottom of the airplane when the plane is in the horizontal position and by a Y axis perpendicular to the X and Z axes and positive toward the right of the airplane in the direction of flight.

The X and Z axes determine a vertical plane of symmetry of the aircraft and the X and Y axes determine a horizontal plane of reference of the aircraft.

Figure 2A:
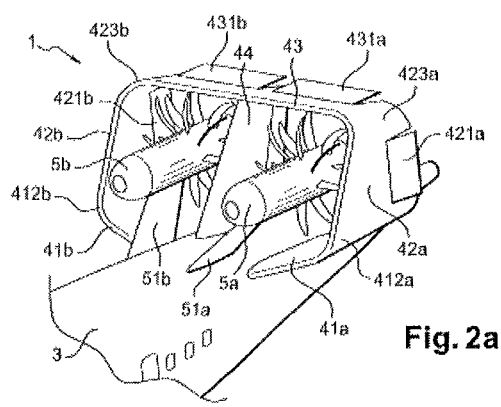
FIG. 2a is a detail of the aft area of the aircraft in FIG. 1 with the tail sections in the operating position.

In the architecture shown in FIG. 1, a detail of which is shown in FIG. 2a, the tail section unit has first lower aerodynamic surfaces 41a, 41b approximately horizontal and attached to the fuselage 3 by root wing sections of said lower aerodynamic surfaces.

Said lower aerodynamic surfaces are fitted approximately symmetrically in relation to the vertical plane of symmetry XZ of the aircraft and form a lower horizontal tail section.

As shown in FIG. 1 and FIG. 2a, the lower aerodynamic surfaces 41a, 41b are not necessarily strictly parallel to the horizontal plane of reference XY and, if necessary, form a dihedral as most often practiced for reasons of aerodynamic behavior in general.

Two second approximately vertical aerodynamic surfaces 42a, 42b, called vertical aerodynamic surfaces, are fitted to the ends opposite the root wing sections of the lower aerodynamic surfaces 41a, 41b, so that said two vertical surfaces extend above the lower aerodynamic surfaces, i.e., in direction of negative Z.

A third so-called upper aerodynamic surface 43, approximately horizontal, also fits above the lower aerodynamic surfaces and is held by the wing ends of said upper aerodynamic surface attached to the upper ends of vertical surfaces 42a, 42b.

In the design just described, the lower aerodynamic surfaces 41a, 41b, the vertical aerodynamic surfaces 42a, 42b and the upper aerodynamic surface 43 form an annular structure forming an aerodynamic duct, attached to the fuselage 3 near the wing root sections of the lower aerodynamic surfaces; the fuselage provides closure for the annular structure.

Preferably, aerodynamic surfaces 41a, 41b, 42a, 42b, 43 are load-bearing surfaces, the approximately flat wing-section type, and are connected to each other by curved aerodynamic forms 412a, 412b, 423a, 423b, providing a progressive aerodynamic and structural connection.

In one preferred embodiment, all or part of the aerodynamic surfaces in the tail section unit (1) are provided with aerodynamic rudders on the trailing edges of said aerodynamic surfaces, i.e., mobile elements used to control the aircraft.

Particularly the vertical aerodynamic surfaces 42a, 42b are advantageously provided with rudders, so called yawing rudders that are approximately vertical 421a, 421b to control the aircraft on the vertical axis Z, and the lower and/or upper aerodynamic surfaces 41a, 41b are provided with so-called pitching rudders, which are approximately horizontal 431a, 431b, to control the aircraft on the Y axis.

In one embodiment, pitch motivators are present only on the lower aerodynamic surfaces or, as in the examples illustrated in the figures, only on the upper aerodynamic surface.

Figure 2B:
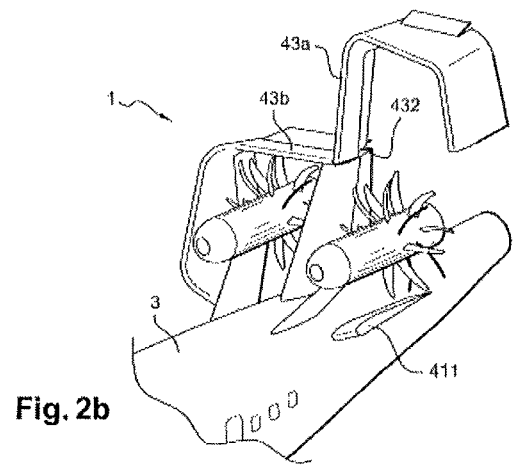
FIG. 2b is a detail of the aft area of the aircraft in FIG. 1 with one side of the tail section in the engine maintenance position.

In one embodiment that is especially suitable for making an aircraft with two aft engines, as illustrated in FIGS. 1, 2a, 2b, a fourth vertical aerodynamic surface 44, called a central rudder, is designed approximately in the vertical plane of symmetry XZ of the aircraft, attached to one of its ends, called the wing section, at the fuselage and to its other end, called the upper end, at the upper aerodynamic surface 43.

In this design with a central rudder. 44, the annular tail section unit has a double-ring structure forming two aerodynamic ducts separated by said central rudder unit.

The central rudder unit 44 makes it possible to increase the structural resistance and rigidity of the tail section unit 1 and, if necessary, has one or more rudder units.

Figure 3:
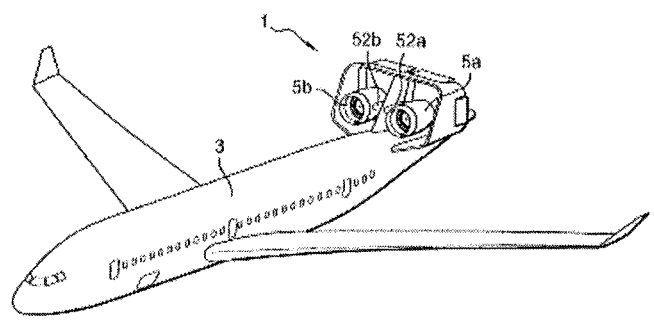
FIG. 3 shows an aft twin-engine aircraft with the tail section in one embodiment.
Figure 4:
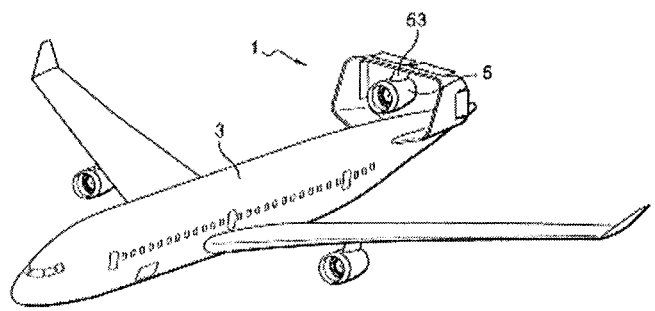
FIG. 4 shows a three-engine jet aircraft with an aft jet that has the tail sections in another embodiment.

According to the disclosed embodiments, as illustrated in FIGS. 1, 3 and 4, one or some engines 5, 5a, 5b are designed in the aerodynamic duct or ducts of the annular tail section unit.

The engines are jets, for example, such as modern jets with high bypass ratios or unducted fan propulsion engines, such as turboshaft engines whose fans are designed for propulsion of fast subsonic airplanes.

In the case of a design with two aft engines 5a, 5b, the central rudder unit 44, when it is used, is advantageously reinforced to provide protection for an engine against debris projected by the other engine in the case of an explosion.

Each engine is maintained by a carrier structure 51a, 51b, 52a, 52b, 53, such as a hooked strut that is attached to the fuselage 3 (case shown in FIG. 1) or to an aerodynamic surface of the annular tail section, particularly to the upper aerodynamic surface 43 (case illustrated in FIG. 4) or the central rudder 44 (case illustrated in FIG. 3).

In these aft aircraft engine designs, the engines 5, 5a, 5b are preferably placed in the direction of the longitudinal axis X so that the noise radiated by said engines, noise radiated by unducted fans or air inputs and/or tubing of said propulsion engines, is masked, at least in part, by the different tail section surfaces.

In one preferred embodiment of the disclosed embodiments, in the case of an aircraft having two aft engines and a central rudder 44, the hooked struts of the engines 5a, 5b are attached to the fuselage 3 or to the central rudder 44.

In this case, the tail section unit 1 forms two rings, a first ring formed by a lower aerodynamic surface 41a, a vertical aerodynamic surface 42a, a part 43a of the upper aerodynamic surface 43 located beside the lower aerodynamic surface considered in relation to the vertical plane of symmetry XZ of the aircraft and the central rudder 44, and a second ring formed by the other lower aerodynamic surface 41b, the vertical aerodynamic surface 42b, one part 43b of the upper aerodynamic surface located beside the lower aerodynamic surface considered in relation to the vertical plane of symmetry XZ of the aircraft and the central rudder 44.

For maintenance purposes, particularly for operations that involve servicing, mounting or disassembling the engines, each ring can be opened and, as shown in FIG. 2b, for one of the two rings, has:

an opening area 411 on the lower aerodynamic surface 41a located near the fuselage 3;

an articulated area 432 of the part 43a located between the upper end of the central rudder 44 and one end of the upper aerodynamic surface located beside the ring in question.

The articulated area 432 is designed to permit upward rotation of an articulated subassembly of the tail section unit 1 on an axis approximately parallel to the longitudinal axis X of the aircraft.

Under normal operation conditions for the aircraft, the ring is closed and means of locking/unlocking, not shown, when in the "locked" position, provide structural continuity of the lower aerodynamic surface 41a in the opening area 411.

The opening area 411 is located near the fuselage 3 or at the boundary between the fuselage 3 and the lower aerodynamic surface 41a.

In the "unlocked" position, which is for a period of aircraft maintenance operations, the opening area 411 frees the articulated subassembly of the ring, which can be swung upward from the aircraft around the articulated area 432.

Swinging the articulated subassembly of the ring up, on one hand, provides access to the engine 5a that goes with the ring in question for inspection, maintenance, if necessary replacement of the engine blades, and the engine hoods can be opened to access internal components to perform maintenance operations without disassembling the engine and, on the other hand, the space located under the engine 5a is freed of all obstacles, and said engine can be lowered or raised for installation or replacement by conventional means of lifting.

In one preferred embodiment, the articulated area 432 is designed near the upper end of the central rudder 44, which makes it possible to make the articulated part of the ring in a single structural assembly that can be very rigid.

In a symmetrical manner, an identical or equivalent design makes it possible to perform maintenance operations on the other engine 5b.

In a design with a single aft engine, as shown in FIG. 4 for an aircraft that also has, for example, engines under the wings, advantageously, the engine 5 is hooked in axial position under the upper aerodynamic surface. In this case, no central rudder is used.

Advantageously, a maintenance well, not shown, is designed in the fuselage perpendicular to the engine. The maintenance well is sealed by a trap door, under normal aircraft operating conditions, and its dimensions are such that the engine can be raised or lowered approximately vertically through the fuselage when the trap doors of the well are open.

Thus, the proposed disclosed embodiments makes it possible to create a tail section unit for an aircraft that has one or more engines located in the aft part of the aircraft, which has continuous forms on the aerodynamic and structural levels and which ensures favorable integration of the engines on the aerodynamic and acoustic levels without penalizing the maintenance operations necessary on the engines.

The invention claimed is:

1. An aft tail section unit for an aircraft having a fuselage and a wing, the aft tail section, comprising:
at least one propulsion engine attached to an aft part of the fuselage located aft of the wing on a longitudinal axis X of the aircraft;
aerodynamic surfaces attached to the aft part of the fuselage; and
at least two approximately horizontal surfaces and at least two approximately vertical aerodynamic surfaces that together form an annular structure that is coupled to the fuselage and in which said at least one engine is mounted.

2. The aft tail section according to claim 1, wherein the at least two horizontal surfaces and at least two vertical aerodynamic surfaces further comprise:
two approximately horizontal lower aerodynamic surfaces attached to the fuselage beside a root wing section so as to be approximately symmetrical in relation to a vertical plane of symmetry XZ of the aircraft;
two approximately vertical aerodynamic surfaces, with each of said two vertical aerodynamic surfaces being attached by one lower end to one end of a lower aerodynamic surface opposite the root wing section of the respective one of the lower aerodynamic surfaces;
an approximately horizontal upper aerodynamic surface attached by the ends of the wing spans to the upper ends of the vertical aerodynamic surfaces;
wherein said lower, vertical and upper aerodynamic surfaces; attached to the fuselage by the lower aerodynamic surfaces, form a ring.

3. The aft tail section according to claim 2 in which one or more lower, upper and vertical aerodynamic surfaces are provided with mobile elements forming aerodynamic rudders.

4. The aft tail section according to claim 2 in which the aerodynamic surfaces are attached to one another by curved connecting and mounting elements.

5. The aft tail section according to claim 2 further comprising a central rudder attached to the fuselage on a lower part of said central rudder and attached to the upper horizontal aerodynamic surface on one top part of said central rudder, with said aft tail section forming a two-ring structure.

6. The aft tail section according to claim 5 in which each structure of a ring includes:
- an opening area of the lower aerodynamic surface located on or near the fuselage; said opening area has means of locking or unlocking parts of said lower aerodynamic surface located on both sides of said opening area;
- an articulated area on one part of the upper aerodynamic surface forming part of the ring in question, with said articulated area allowing upward movement by rotation of an axis approximately parallel to a longitudinal axis X of the aircraft, when the means of locking or unlocking are in the unlocked position.

7. An aircraft comprising an aft tail section according to claim 2 further comprising a propulsion engine attached to the upper horizontal aerodynamic surface and under said upper horizontal aerodynamic surface by a support strut.

8. The aft tail section according to claim 1 wherein the at least one engine comprises two propulsion engines that are fitted approximately in the annular structure and each of said engines is attached to the fuselage by a support strut.

9. The aft tail section according to claim 5, wherein the at least one engine further comprises two propulsion engines that are each fitted approximately in a respective ring of the two-ring structure, and said engines are each attached to the central rudder by a support strut.

* * * * *

UNITED STATES PATENT AND TRADEMARK OFFICE
CERTIFICATE OF CORRECTION

PATENT NO. : 8,573,530 B2
APPLICATION NO. : 12/516594
DATED : November 5, 2013
INVENTOR(S) : Olivier Cazals et al.

It is certified that error appears in the above-identified patent and that said Letters Patent is hereby corrected as shown below:

In the Claims

Claim 1, Column 6, line 27, delete the "," after "section" and before "comprising"

Signed and Sealed this
Twenty-eighth Day of January, 2014

Michelle K. Lee
*Deputy Director of the United States Patent and Trademark Office*